United States Patent
Khorasani

(10) Patent No.: US 9,754,406 B2
(45) Date of Patent: Sep. 5, 2017

(54) MULTIPLE LIGHT SOURCE SIMULATION IN COMPUTER GRAPHICS

(71) Applicants: VOLKSWAGEN AG, Wolfsburg (DE); AUDI AG, Ingolstadt (DE)

(72) Inventor: George Allen Khorasani, San Mateo, CA (US)

(73) Assignees: Volkswagon AG (DE); Audi AG (DE)

( * ) Notice: Subject to any disclaimer, the term of this patent is extended or adjusted under 35 U.S.C. 154(b) by 0 days.

(21) Appl. No.: 14/980,831

(22) Filed: Dec. 28, 2015

(65) Prior Publication Data

US 2017/0186221 A1    Jun. 29, 2017

(51) Int. Cl.
| | |
|---|---|
| *G06T 15/50* | (2011.01) |
| *G06T 17/20* | (2006.01) |
| *G06T 13/60* | (2011.01) |
| *G06T 19/20* | (2011.01) |

(52) U.S. Cl.
CPC ........... *G06T 15/506* (2013.01); *G06T 13/60* (2013.01); *G06T 17/20* (2013.01); *G06T 19/20* (2013.01); *G06T 2200/24* (2013.01)

(58) Field of Classification Search
CPC ....... G06T 15/04; G06T 15/50; G06T 15/506; G06T 15/005; G06T 11/001; G06T 11/40; G06T 13/20; G06T 15/83; G06T 17/20; G06T 17/00; G06T 17/205; G06T 19/00
See application file for complete search history.

(56) References Cited

U.S. PATENT DOCUMENTS

| | | | |
|---|---|---|---|
| 6,407,744 B1 | 6/2002 | Van Overveld | |
| 6,674,918 B1* | 1/2004 | Liu | G06T 5/50 345/426 |
| 2007/0038421 A1* | 2/2007 | Hu | G06F 17/5009 703/6 |
| 2007/0273686 A1* | 11/2007 | Watanabe | G06T 15/506 345/419 |
| 2008/0246758 A1* | 10/2008 | Strassenburg-Kleciak | G06T 17/20 345/419 |
| 2009/0024628 A1* | 1/2009 | Angel | G03B 37/00 |
| 2015/0042654 A1* | 2/2015 | Segasby | G06T 15/06 345/426 |

OTHER PUBLICATIONS

Landis, Hayden; Production-Ready Global Illumination; PIXAR; https://renderman.pixar.com/view/production-ready-global-illumination, 11 pages; Jul. 4, 2012.

* cited by examiner

*Primary Examiner* — Haixia Du
(74) *Attorney, Agent, or Firm* — Barnes & Thornburg LLP

(57) ABSTRACT

Light sources are simulated by using a surface normal perturbation method. A mesh representing the surface of an object and containing surface normals is provided. A light source vector representing the orientation of the surface toward a light source is generated. Based on light intensity adjustments input by a user, the surface normals are perturbed in a lighting equation to simulate a change in light intensity on the surface without rotating the surfaces relative to the scene.

15 Claims, 5 Drawing Sheets

MULTIPLE LIGHT SOURCE SIMULATION IN COMPUTER GRAPHICS

BACKGROUND OF THE INVENTION

In computer graphics, as 3D models and scenes become more complex, lighting's impact on performance, particularly in a resource-constrained, embedded device like the instrument cluster and the center stack on an automobile, can be substantial. Typically, to be able to achieve desired lighting of individual components in the scene, more lights must be added. With each light there is a performance penalty with an increase in the amount of runtime memory needed.

SUMMARY OF THE INVENTION

The disclosed embodiments includes methods, systems and computer readable media, programmed and configured to adjust the lighting of computer graphics and render images with modified lighting.

Pursuant to illustrative embodiments of the invention, multiple light sources are simulated where fewer sources actually exist, or brightness is reduced without removing light sources. This is accomplished by using a surface normal perturbation method. A mesh representing the surface of an object and containing surface normals is provided. The normal to the surface is identified, which determines the orientation of the surface in 3D space. A light source vector representing the orientation of the surface toward a light source is generated. Based on light intensity adjustments input by a user, the surface normal is perturbed in a lighting equation to simulate a change in light intensity on the surface without rotating the surface relative to the scene. The surface is then rendered with the simulated light intensity modification.

Embodiments of the invention may be used for example, in instrument clusters and center stack of automobiles or other motor vehicles. Embodiments of the invention can also be utilized in computer graphics for design applications.

DESCRIPTION OF THE DRAWINGS

The detailed description of illustrative embodiments of the invention refers to the accompanying figures in which.

DETAILED DESCRIPTION OF THE INVENTION

The figures and description provided herein include the necessary information for one skilled in the art to carry out embodiments of the invention, including the disclosed methods, systems and non-transitory computer readable media. Those skilled in the art may recognize that other components and steps may be desirable or necessary to implement embodiments of the invention in its various forms. As such steps and components that are deemed known by one skilled in the art are inherently included in this disclosure.

Figure 1:
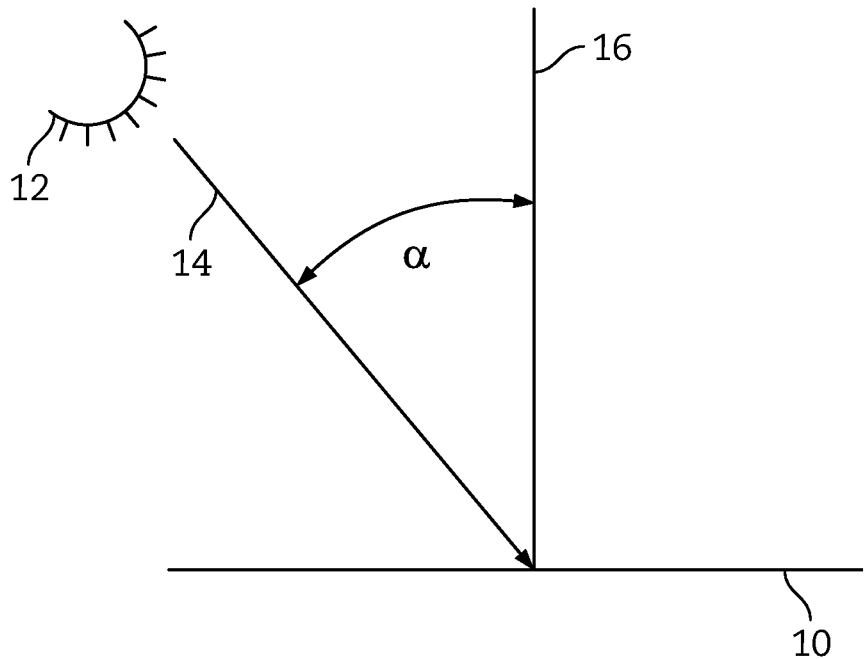
FIG. 1 illustrates a surface and a light source. Further shown is the associated surface normal and a light source vector that represents the orientation of the surface toward a light source. An angle, α, is identified, the cosine of which provides the light intensity according to Lamberts shading law, which is used in known lighting modeling.

FIG. 1 illustrates a surface 10 and a light source 12. Light intensity depends on the orientation of surface 10 with respect to light source 12 as calculated according to Lamberts cosine law. When a closed polygon is rendered according to a Lambertian modeling technique, light is reflected equally in all directions. In an illustrative embodiment of the invention, the closed polygon used is a triangle within a 3D mesh.

FIG. 1 shows a light source vector 14 that represents the orientation of a surface 10 toward a light source. A surface normal 16 is shown originating from a point coincident with light source vector 14. For a point on a curved surface the surface normal is perpendicular to a tangent to the surface curve at that point. According to Lambert's law, the cosine of the angle α, which is the angle between light source vector 14 and normal 16, represents the intensity of the light at the vector origination point on the surface. As surface 10 is turned towards light source 12, the angle between light source vector 14 and surface normal 16 decreases. As the position of light source vector 14 moves toward surface normal 16, the light intensifies, and thus, cosine α increases. Traditionally, when working with lighting of a surface that is part of an existing mesh, if greater light intensity is desired, the surface can either be turned toward the light source or additional light sources can be added. Adding additional lights to generate increased light intensity in a scene comes with a performance penalty, so embodiments of the invention modify the lighting by simulating additional lights without actually adding them.

Figure 2:
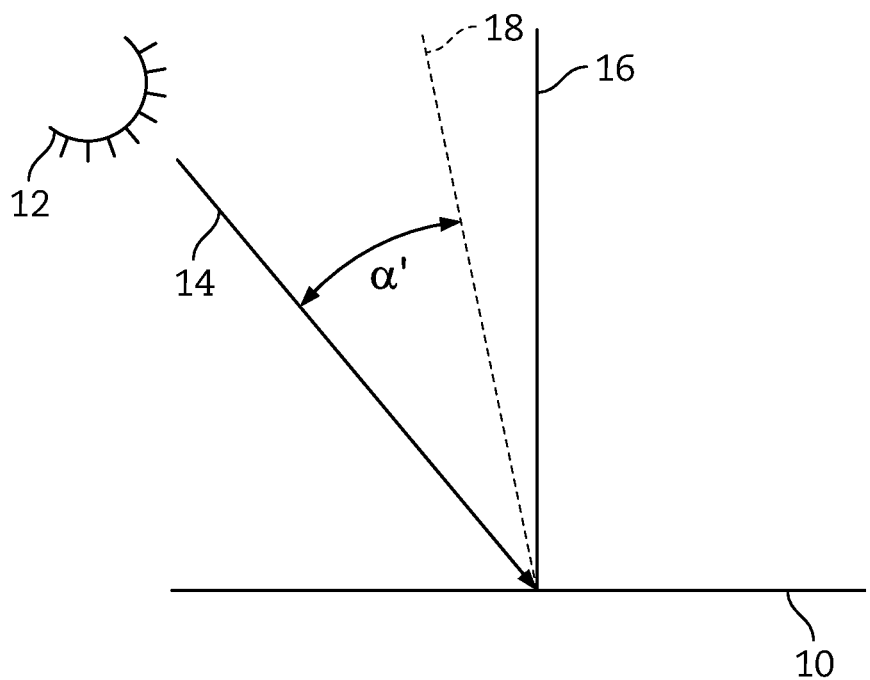
FIG. 2 illustrates the surface, light source, surface normal and light source vector of FIG. 1, with an additional 'perturbed' surface normal that is the basis for lighting modification calculations and renderings, according to an illustrative embodiment of the invention.

FIG. 2 illustrates the surface 10, light source 12, light source vector 14 and surface normal 16 of FIG. 1, with an additional 'perturbed' surface normal 18 that is the basis for lighting modification calculations and renderings, according to an illustrative embodiment of the invention. Performing the same light intensity calculations with the perturbed surface normal 18 substituted for the actual surface normal 16, simulates a surface orientation without rotating the surface visually. To accomplish this, α', the angle between light source vector 14 and perturbed normal 18, is substituted for α in Lambert's cosine law calculation. This provides the sense that the surface is being lit by a separate or additional light, either making the surface look darker by turning its normal away from the light source or brighter by turning its normal towards the light source.

Figure 3:
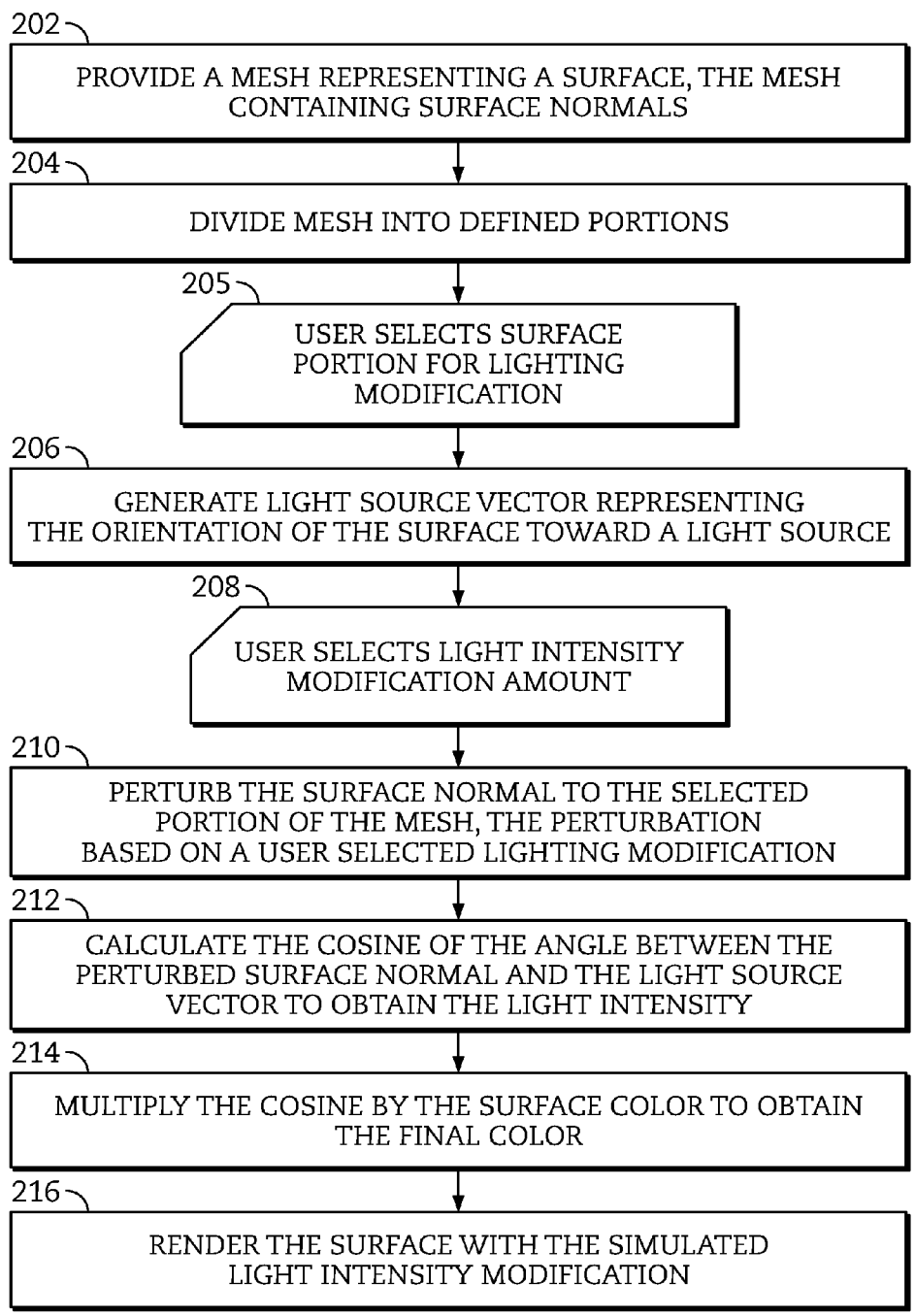
FIG. 3 is a flow chart of a method to modify the lighting of a surface in an image, according to an illustrative embodiment of the invention. A mesh representing a surface and containing surface normals is provided. The mesh is divided into delineated portions for individual lighting modifications. A user selects a surface portion and inputs the desired lighting modification. The input perturbs the surface normal so that increased or decreased light intensity is simulated without actually changing the orientation of the surface with respect to the light source or adding or removing light sources.

FIG. 3 is a flow chart of a method to modify the lighting of a surface in an image, according to an illustrative embodiment of the invention. A mesh is provided is step 202 representing a surface in the computer image. The steps are implemented as program instructions stored in computer readable medium of a computer system. The mesh can be created offline, or online for example at load time, however, offline creation improves typical program performance. The mesh can be constructed of polygons, and may include, for example, a collection of surface normals, vertices, edges and faces that define the shape of the 3D surface. At a minimum, the mesh must contain surface normals for utilization in the illustrative methods. Triangular meshes are used in an exemplary embodiment of the invention because they encompass the least number of vertices needed to represent the surface by a polygon mesh. Volumetric meshes that contain both surface and volume information may be provided in step 202, but it is the surface mesh that is acted upon by the illustrative method(s). The mesh is divided or broken up into delineated portions in step 204 so that light simulation of individual areas or materials can be individually accomplished for each portion. This too can be performed either offline, or online such as at load time. The delineated mesh allows the process to be performed on individual parts or materials in a scene, thereby modifying the lighting on one portion without affecting the light intensity elsewhere in the image.

In step 205 a user selects the portion of a surface on which the user wants to simulate either an increased or decreased light intensity. In step 206, the program generates one or more light source vectors that represent the orientation of a user-selected surface toward a light source. This step can be performed at any time in the sequence, provided the light source vector is available for calculating the modified light intensity. A user selects the degree of light intensity increase or decrease to be performed in step 208. Based on the user's selected lighting modification, the surface normal is either perturbed toward or away from the light source vector in step 210. The normal is moved toward the light source vector if an intensity increase is desired or away from the light source vector to dim the lighting. In step 212, the cosine of the angle between the perturbed surface normal and the light source vector is calculated to obtain the modified light intensity. In step 214 the cosine is multiplied by the surface color to obtain the final color of the selected surface. Once the light intensity and surface color have been calculated by the program, the surface is rendered with the modified lighting and color in step 216. This light-modification method can be applied to an animated scene having a plurality of frames, wherein the method is applied to each frame.

A texture is not created and loaded from which normals are read. Instead, a mesh is loaded into memory. The mesh provides the normals that will be perturbed to adjust the light intensity. This reduces the amount of memory and processing required as compared to methods such as bump mapping in which geometry details are created by reading normals from a texture. The mesh may be built off-line, for example with a program such as Maya® or other 3D computer modeling software. The delineation of the mesh into portions for separate light modification can also be done off-line by computer modeling software.

Computer code according to an illustrative embodiment of the invention includes in part:

uniform highp float normalpret;

to perturb the normal, the degree of which is set by a user, such as through a graphical user interface; and normal.$y$*=normalpret;

which causes the normal to be "turned" or "twisted" by the value passed along the Y-axis. This modifies the lighting based on the direction of perturbed normal.

Figure 4:
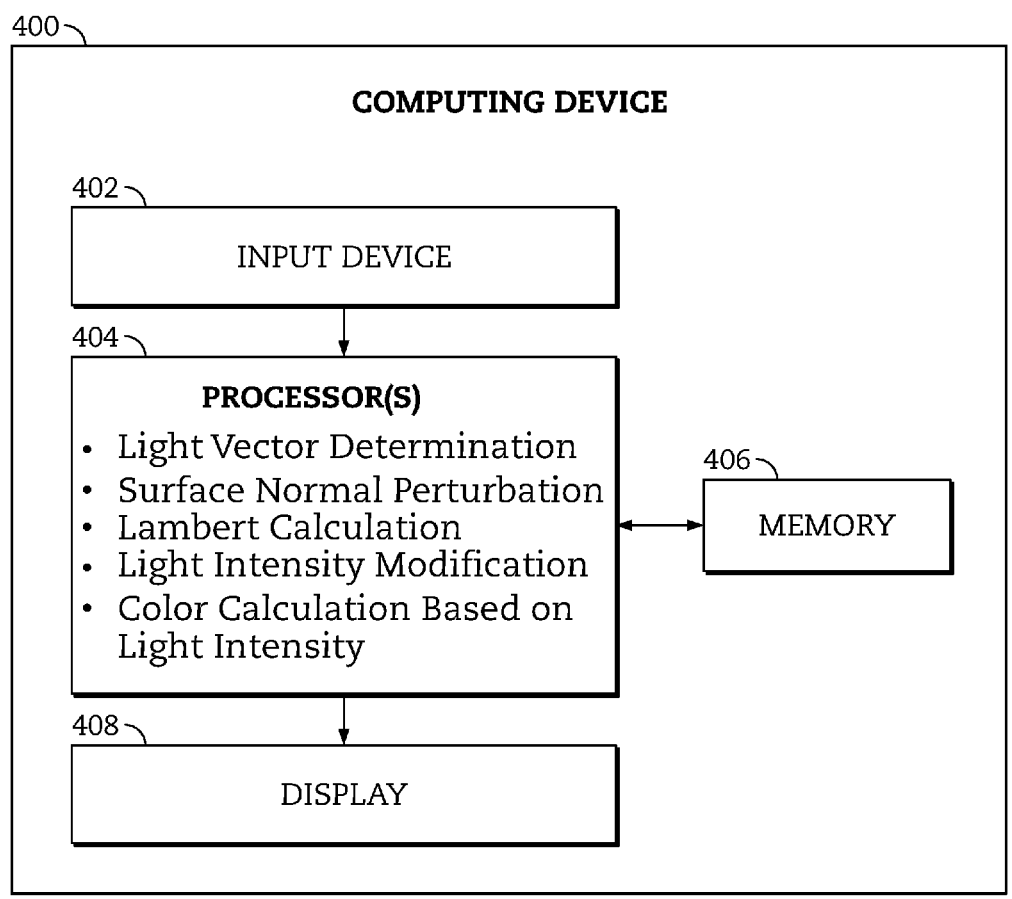
FIG. 4 is a diagram of a system for simulating multiple light sources in a computer image according to an illustrative embodiment of the invention. It includes an input device to transmit a user's selections as signals to a processor. The selections include an image portion and lighting modification choices. Light intensity modification steps are stored as program instructions in a memory device that are implemented by the processor. The processor performs a Lambert calculation on a perturbed normal to the selected surface portion to simulate a lighting adjustment. A display is functionally connected to the processor to render in real time the surface with the lighting modifications.

FIG. 4 is a diagram of a system 400 in which the light source simulation method can be carried out, according to an illustrative embodiment of the invention. A user inputs selections, such as the surface to be acted upon or the degree of light intensity modification, using input device 402. Input device 402 may be for example, a computer mouse or keyboard. Any device that allows a user to transmit selections, such as image portion or light intensity choices, to the processor(s) can serve as an input device.

A user interface is employed that is configured to accept user selections from an input device 402. User interfaces may be displayed on a computer screen and may be in the form of a drop down menu or various possible images on which a user may point and click to make a selection. The display may be display 408, which will be described further below, or an additional display device. An interface can also be constructed to allow a user to input choices by entering numerical values. A touch screen can also serve as an input device.

Input device 402 transmits a signal to processor 404. Processor 404 can be a single processor or include multiple processors. The illustrative light intensity modification steps are stored as program instructions in a computer readable medium, or a plurality of memory devices 406, such as non-transitory storage devices. Processor 404 implements the instructions stored in computer readable medium 406. Illustrative steps performed by processor 404 include:

light vector determination
surface normal perturbation
Lambert Calculation
light intensity modification
color calculation based on light intensity The steps or other logic actions can be implemented on a processor or processing apparatus that includes, for example, a graphics processing unit (GPU) and/or a computer processing unit (CPU). Graphic libraries, such as OpenGL, can be used to implement the operations on the processors. Various GPU application program interfaces (APIs) can be used to implement embodiments of the invention.

The memory device may any computer readable media for containing code that can be implemented by the system's processor(S) to carry out the desired steps, such as for example volatile and non-volatile, removable and non-removable media, including but not limited to ROM, PROM, EPROM, EEPROM, RAM, SRAM, DRAM, flash memory, CD-ROM, DVD.

Display 408 is functionally connected to processor 404 to provide a visual representation of the output of processor 404. The image or scene upon which the methods are performed is shown on display 408. Light intensity adjustments to the image or scene can be shown in real-time on display 408.

The components of system 400 can be incorporated into a single device, or may be a plurality of devices that are functionally connected. A person of ordinary skill in the art will appreciate other or additional components that can be included in system 400 to implement the various embodiments of the invention, and therefore, such knowledge is deemed inherently contained in this disclosure.

Figure 5:
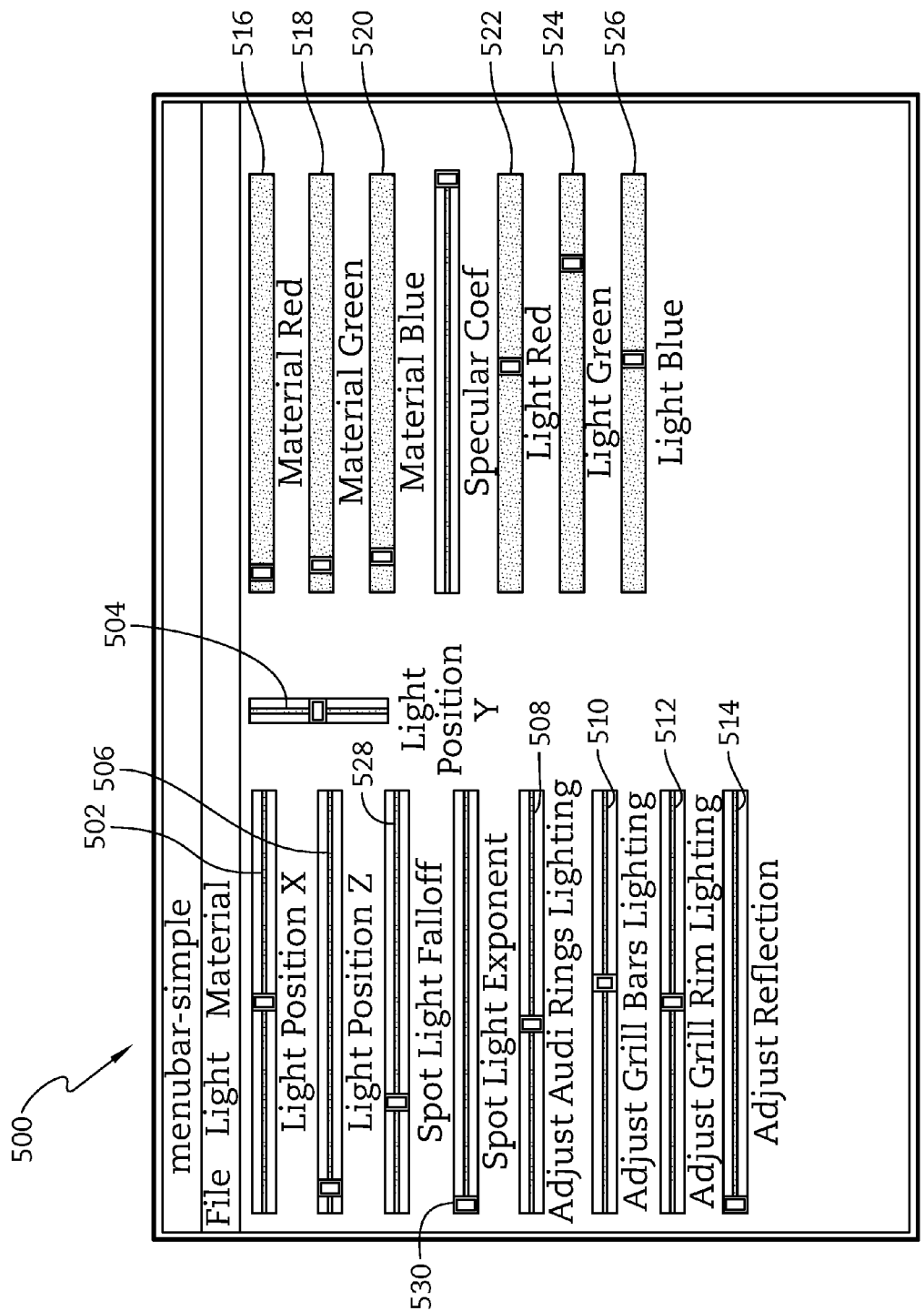
FIG. 5 depicts a user interface to enable a user to input lighting modification selections for individual portions of an image, according to an illustrative embodiment of the invention. It includes a means for selecting surface positions and portions of the image to undergo lighting modifications. Material and light color choices can be made via the interface. Light concentration can be controlled by adjusting the spot light exponent. Light falloff modifications are also adjustable through the interface.

FIG. 5 depicts a user interface 500 to enable a user to input lighting modification selections for individual portions of an image, according to an illustrative embodiment of the invention. User interface 500 includes Cartesian coordinates x, y and z adjustment components 502, 504, 506, respectively, to position a light source. Slider-type adjustment components 502, 504, 506 are provided to adjust the position of each of the three Cartesian coordinates, x, y, z, respectively, which are labeled as light position x, light position y and light position z. Any adjustment component can be used that is compatible with the system and methods. Each illustrative slider adjustment component 502, 504, 506 provides a continuous adjustment across a linear expanse. In a further illustrative embodiment of the invention, a position is identified by a single adjustment component that represents all three coordinates. The system can also be designed so that x, y and z adjustments are made by discrete amounts. Numerical inputs, for example, lend themselves to discrete positional changes.

The user adjusts the lighting on one or more portions of the image. In this illustrative example, interface 500 is suitable for modifying lighting on an image of a car. The image components have been divided into automobile parts, which include a logo, designated as the "Audi Rings," the grill bars and the grill rim. Slider adjustment components 508, 510, 512 correspond, respectively, to each of the aforementioned automobile parts. The reflection can be separately adjusted by slider adjustment component 514.

The light color and the material color are separately adjustable in this illustrative embodiment of the invention. Light color adjustments are derived from specular color adjustments, such as changes to the specular coefficient, and thus, will typically be associated with a bright spot on the image. This will often be the case with shiny materials such as polished metals. An illustrative schematic of specular reflection is provided in FIG. 6A and will be discussed further below.

User interface 500 also provides the ability to adjust the spotlight falloff and spotlight exponent. Slider 528 is the spotlight falloff adjustment component, which controls how light intensity decreases between the outer edge of an inner cone and the inner edge of an outer cone of the spotlight. By dragging the falloff slider, the beam can be adjusted between a relatively sharp edge to a more blurred edge.

By dragging slider 530 the spotlight exponent can be adjusted to control the light concentration. The exponent is increased to create a more focused light source.

Figure 6:
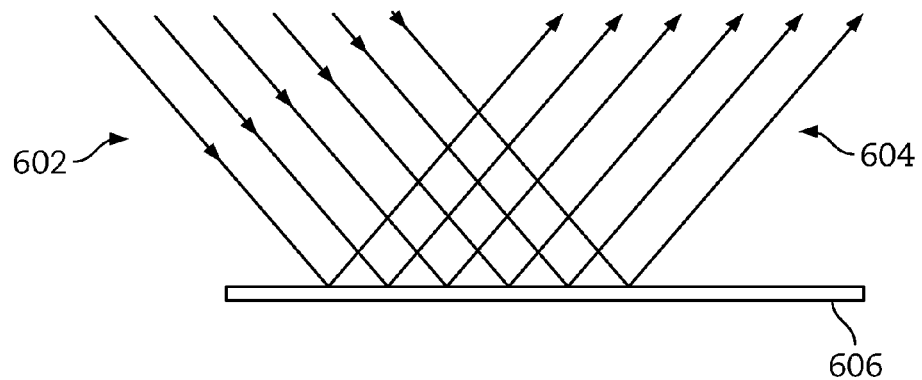
FIG. 6 is a schematic representation of depicts specular reflection created by a smooth surface, according to know principles.

FIG. 6 shows incoming light 602 and reflected light 604 from smooth surface 606. In an ideal reflector the angle of incidence of incoming light 602 is equal to the angle of reflection. In a perfect reflector, a viewer sees the reflection at just one point. If the surface is irregular, as nearly all surfaces are, diffuse reflection will take place in which incoming light is reflected at numerous angles.

Figure 7:
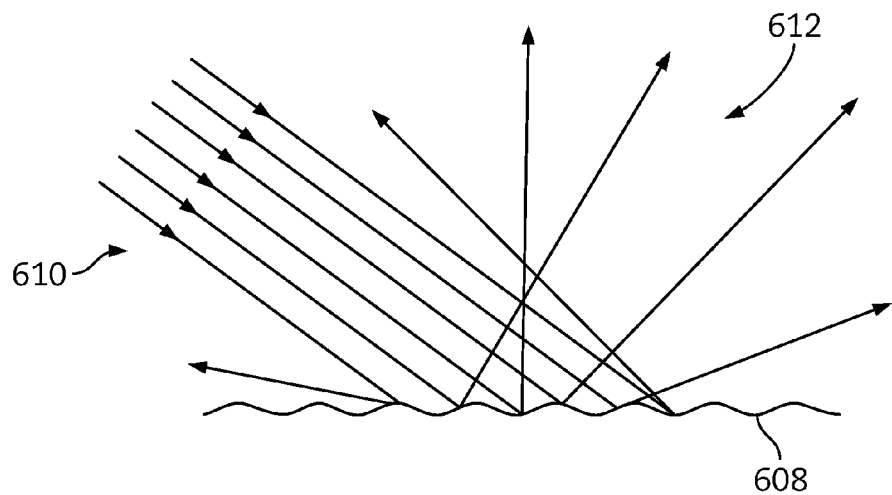
FIG. 7 is a schematic representation of diffuse reflection produced by an irregular surface, according to known principles.

FIG. 7 is an illustrative schematic of diffuse reflection from an irregular surface 608. Incoming light 610 is reflected in a number of directions representative of the varying surface topography and is shown by reflected light 612. It is noted that arrowheads on representations of reflected light 604, 610 only indicate direction and not vector termination points.

Material color adjustments are derived from diffuse color adjustments. Interface 500 has three material adjustment components 516, 518, 520, which in this exemplary embodiment are shown as slider adjustments and labeled material red, material green and material blue, respectively. Light adjustments 522, 524, 526 are also shown as slider adjustments, and modify the specular coefficient. Light adjustments 522, 524, 526 are labeled as light red, light green and light blue, respectively, and modify those lighting colors. Adjustments of red, green and blue may be sufficient to create all required colors; however, additional color adjustments may be included.

Additional color adjustments can be included, such as ambient color, which is the color of illumination originating from other than the light source, if any. Similarly, emission color can be accounted for.

With any of the slider adjustments, numerical values for each of the adjustments that are associated with changes in the location of the slider can be presented as the slider is repositioned. Interface adjustment components can be associated with non-numerical indicators, numerical values or a combination of the two, as variations in a quantity are input.

The lighting adjustment sliders are associated with the degree and direction of perturbation of the surface normal necessary for the cosine of the angle between the surface normal and the light source vector to achieve the desired lighting modification. So the adjustments perturb the normal to simulate an orientation of the surface in the lighting equation, without rotating the surface visually, to simulate the sense that the surface is being lit by a separate light, either making the surface look darker by turning its normal away from the light, or brighter by turning its normal towards the light. This gives the designer the option of "tweaking" the look of the surface lighting without having to have a separate light for the specific surface.

The modifications are done in real time so the user sees on the display the light intensity changes as they are input.

Embodiments of the invention may provide a technical solution to the performance impact of lighting in computer graphics, especially in resource-constrained, embedded devices such as instrument clusters and center stacks that may be incorporated into motor vehicles, for example. To achieve desired lighting of individual components of an image, more lights are typically added. For each additional light there is a performance penalty. Instead of adding more lights to a scene, embodiments of the invention simulate additional lights, so in many instances the impact on performance caused by the increased light intensity will be reduced or eliminated. Furthermore, creating the mesh offline and dividing it into portions offline, may enhance performance. Additionally, the segmented mesh allows lighting modifications to affect only selected portions.

The invention is not limited to the specific embodiments disclosed, and may include different combinations of the elements disclosed or omission of some elements and the equivalents of such structures. Modifications, for example, to combinations of elements, light intensity calculations and variables, and incorporation of equivalent components and steps, may be made without departing from the invention.

The invention claimed is:

1. A system for simulating multiple light sources in a computer image comprising:
   one or more processors operatively coupled to one or more non-transitory storage devices on which is stored executable computer code, which when executed by the one or more processors causes the system to modify the lighting on a surface in a scene without adding or removing light sources, wherein the surface is represented as a mesh containing surface normals;
   a display operatively connected to at least one of the one or more processors for displaying the scene; and
   a means for simulating a change in light intensity on the surface, without rotating the surface relative to the scene, by perturbing a surface normal in a lighting equation, the means for simulating a change in light intensity configured to:
   act upon a selected delineated mesh portion of the surface to simulate light intensity modification of the delineated mesh portions;
   generate a light source vector originating at a point coincident with the surface normal and directed toward a light source, the light source vector representing the orientation of the surface in the scene toward a light source;
   perturb the surface normal for a delineated portion of the mesh by a selected angular amount toward or away from the light source vector based on user input of a chosen light intensity modification value;
   calculate the cosine of the angle between the perturbed surface normal and the light source vector;
   adjust light intensity based on the calculated cosine to simulate an adjusted orientation of the surface, thereby modifying the lighting of the surface; and
   render the surface with the simulated light intensity modification;
   wherein the display displays the scene with the simulated light intensity change.

2. The system of claim 1 wherein the means for simulating a change in light intensity is further configured to render the surface with the simulated light intensity modification in real-time.

3. The system of claim 1 further comprising:
   user controls for selecting the degree of light intensity modification and surface portion to be modified.

4. The system of claim 1 wherein one or more mesh portions are delineated, and each of the one or more delineated mesh portions represents a different type of material.

5. The system of claim 1 wherein the mesh is created offline.

6. The system of claim 1 further comprising an instrument cluster in a motor vehicle, wherein the system is operatively incorporated into the instrument cluster.

7. A method of simulating multiple light sources carried out by one or more processors configured with executable instructions, the method comprising:
   providing a surface representation in the form of a mesh with portions delineated for light intensity adjustment simulation, the mesh including surface normals;
   selecting a mesh portion;
   generating a light source vector originating at points coincident with the surface normal and directed toward a light source, the light source vector representing the orientation of the surface toward a light source;
   inputting a chosen light intensity modification value;
   perturbing the surface normal for a delineated portion of the mesh by a selected angular amount toward or away from the light source vector to achieve the chosen light intensity modification value;
   calculating the cosine of the angle between the perturbed surface normal and the light source vector to obtain the light intensity modification;
   multiplying the cosine by the surface color to obtain an adjusted color, thereby simulating modified lighting of the surface; and
   rendering the surface with the simulated lighting modification.

8. The method of claim 7 further comprising rendering the surface with the simulated light intensity modification in real-time.

9. The method of claim 7 wherein the method is applied to an animated scene having a plurality of frames, wherein the method is applied to each frame.

10. The method of claim 7 wherein each delineated mesh portion represents a different type of material.

11. The method of claim 7 wherein the mesh is created offline.

12. The method of claim 7 wherein the method is implemented on a device in an automobile instrument cluster.

13. A non-transitory computer-readable storage medium on which is stored computer code, which when executed on one or more processors causes a computer system to perform the computer graphics light modification method of:
   receiving a surface representation in the form of a mesh with portions delineated for light intensity adjustment simulation, the mesh including surface normals;
   receiving a mesh portion selection;
   generating a light source vector originating at points coincident with the surface normal and directed toward a light source, the light source vector representing the orientation of the surface toward a light source;
   receiving a chosen light intensity modification value;
   perturbing the surface normal for the selected portion of the mesh by a selected angular amount toward or away from the light source vector to achieve the chosen light intensity modification value;
   calculating the cosine of the angle between the perturbed surface normal and the light source vector to obtain the light intensity modification;
   multiplying the cosine by the surface color to obtain an adjusted color, thereby simulating modified lighting of the surface; and
   rendering the surface with the simulated lighting modification.

14. The non-transitory computer-readable storage medium of claim 13 further comprising rendering the surface with the simulated light intensity modification in real-time.

15. The non-transitory computer-readable storage medium of claim 13 wherein each delineated mesh portion represents a different type of material.

* * * * *